(12) United States Patent
Momcilovic et al.

(10) Patent No.: US 11,282,233 B1
(45) Date of Patent: Mar. 22, 2022

(54) MOTION CAPTURE CALIBRATION

(71) Applicant: Weta Digital Limited, Wllington (NZ)

(72) Inventors: Dejan Momcilovic, Wellington (NZ); Jake Botting, Wellington (NZ)

(73) Assignee: WETA DIGITAL LIMITED, Wellington (NZ)

(*) Notice: Subject to any disclaimer, the term of this patent is extended or adjusted under 35 U.S.C. 154(b) by 0 days.

(21) Appl. No.: 17/185,933

(22) Filed: Feb. 25, 2021

Related U.S. Application Data

(60) Provisional application No. 63/075,768, filed on Sep. 8, 2020, provisional application No. 63/075,773, filed on Sep. 8, 2020, provisional application No. 63/075,769, filed on Sep. 8, 2020.

(51) Int. Cl.
G06T 7/80 (2017.01)

(52) U.S. Cl.
CPC ...... *G06T 7/80* (2017.01); *G06T 2207/30244* (2013.01)

(58) Field of Classification Search
CPC .................. G06T 7/80; G06T 2207/30244
See application file for complete search history.

(56) References Cited

U.S. PATENT DOCUMENTS

| | | | | |
|---|---|---|---|---|
| 2003/0004694 A1* | 1/2003 | Aliaga | ............. | G06T 5/006 703/2 |
| 2004/0155962 A1* | 8/2004 | Marks | ............. | G06T 7/50 348/169 |
| 2004/0178955 A1* | 9/2004 | Menache | ............. | A63F 13/213 342/463 |
| 2005/0017968 A1* | 1/2005 | Wurmlin | ............. | G06T 17/00 345/419 |
| 2012/0330601 A1* | 12/2012 | Soubra | ............. | G01S 1/725 702/150 |
| 2015/0170416 A1* | 6/2015 | McGregor | ............. | G06T 17/00 345/420 |
| 2016/0335782 A1* | 11/2016 | Sundaresan | ............. | G06T 15/506 |
| 2016/0364867 A1* | 12/2016 | Moteki | ............. | G06T 7/73 |
| 2017/0136626 A1* | 5/2017 | Wang | ............. | B25J 9/1692 |
| 2018/0184998 A1* | 7/2018 | Nyholm | ............. | A61B 5/0035 |
| 2019/0037207 A1* | 1/2019 | Brockers | ............. | G06T 7/74 |
| 2019/0043221 A1* | 2/2019 | Torma | ............. | H04N 13/282 |
| 2019/0206084 A1* | 7/2019 | Noble | ............. | G06T 7/73 |
| 2019/0221003 A1* | 7/2019 | Zhou | ............. | G06K 9/00771 |
| 2020/0011668 A1* | 1/2020 | Derby | ............. | G01C 21/206 |
| 2020/0394821 A1* | 12/2020 | Huang | ............. | A61B 6/582 |

* cited by examiner

*Primary Examiner* — Ming Y Hon
(74) *Attorney, Agent, or Firm* — Trellis IP Law Group, PC

(57) ABSTRACT

Embodiments facilitate the calibration of cameras in a live action scene. In some embodiments, a system receives images of the live action scene from a plurality of cameras. The system further receives reference point data generated from a performance capture system, where the reference point data is based on at least three reference points, where the at least three reference points are positioned within the live action scene, and where distances between the at least three reference points are predetermined. The system further determines a location and orientation of each camera based on the reference point data.

20 Claims, 13 Drawing Sheets

MOTION CAPTURE CALIBRATION

CROSS-REFERENCE TO RELATED APPLICATIONS

This application claims the benefit of U.S. Provisional Patent Application Ser. No. 63/075,768, entitled MOTION CAPTURE CALIBRATION, filed on Sep. 8, 2020 and U.S. Provisional Patent Application Ser. No. 63/075,769, entitled MOTION CAPTURE CALIBRATION USING A THREE-DIMENSIONAL ASSEMBLY, filed Sep. 8, 2020 and U.S. Provisional Patent Application Ser. No. 63/075,773, entitled MOTION CAPTURE CALIBRATION USING A WAND, filed Sep. 8, 2020, which are hereby incorporated by reference as if set forth in full in this application for all purposes.

This application is related to the following applications, U.S. patent application Ser. No. 17/185,935, entitled MOTION CAPTURE CALIBRATION USING A THREE-DIMENSIONAL ASSEMBLY, filed on Feb. 25, 2021 and U.S. patent application Ser. No. 17/185,937, entitled MOTION CAPTURE CALIBRATION USING A WAND, filed on Feb. 25, 2021, which are hereby incorporated by reference as if set forth in full in this application for all purposes.

BACKGROUND

Many visual productions (e.g., movies, videos, clips, and recorded visual media) include combinations of real and digital images to create animation and special effects that form an illusion of being integrated with live action. For example, a visual production may include a live actor in a location shoot appearing in a scene with a computer-generated ("CG," "virtual," or "digital") character. It is desirable to produce seemingly realistic visual productions by compositing CG items with the live action items. Often, several types of cameras are used on a set, where each camera provides different data, such as images of the live action scene, depth information, tracking of markers in a live action scene, etc. It is necessary to calibrate the various camera data in real-time to accurately composite the live action elements with CG images and produce a realistic looking visual production.

SUMMARY

Embodiments generally relate to the calibration of cameras in a live action scene. Embodiments provide for automated calibration of cameras in a live action scene using reference points in images captured by the cameras. In various embodiments, a system receives images of the live action scene from a plurality of cameras. The system further receives reference point data generated from a performance capture system, where the reference point data is based on at least three reference points, where the at least three reference points are positioned within the live action scene, and where distances between the at least three reference points are predetermined. The system further determines a location and orientation of each camera based on the reference point data.

DETAILED DESCRIPTION OF EMBODIMENTS

Embodiments facilitate the calibration of cameras in a live action scene. In some embodiments, an automated system calibrates cameras in a live action scene using reference points in images captured by the cameras. This calibration may be referred to as motion capture (MoCap) calibration. Embodiments described herein enable the system to provide a calibrated multiview vision system for tracking reference points, which may include active and/or passive reference markers.

In various embodiments, a system receives images of the live action scene from a plurality of cameras. The system further receives reference point data generated from a performance capture system, where the reference point data is based on at least three reference points, where the at least three reference points are positioned within the live action scene, and where distances between the at least three reference points are predetermined. The system further determines a location and orientation of each camera based on the reference point data.

Figure 1:
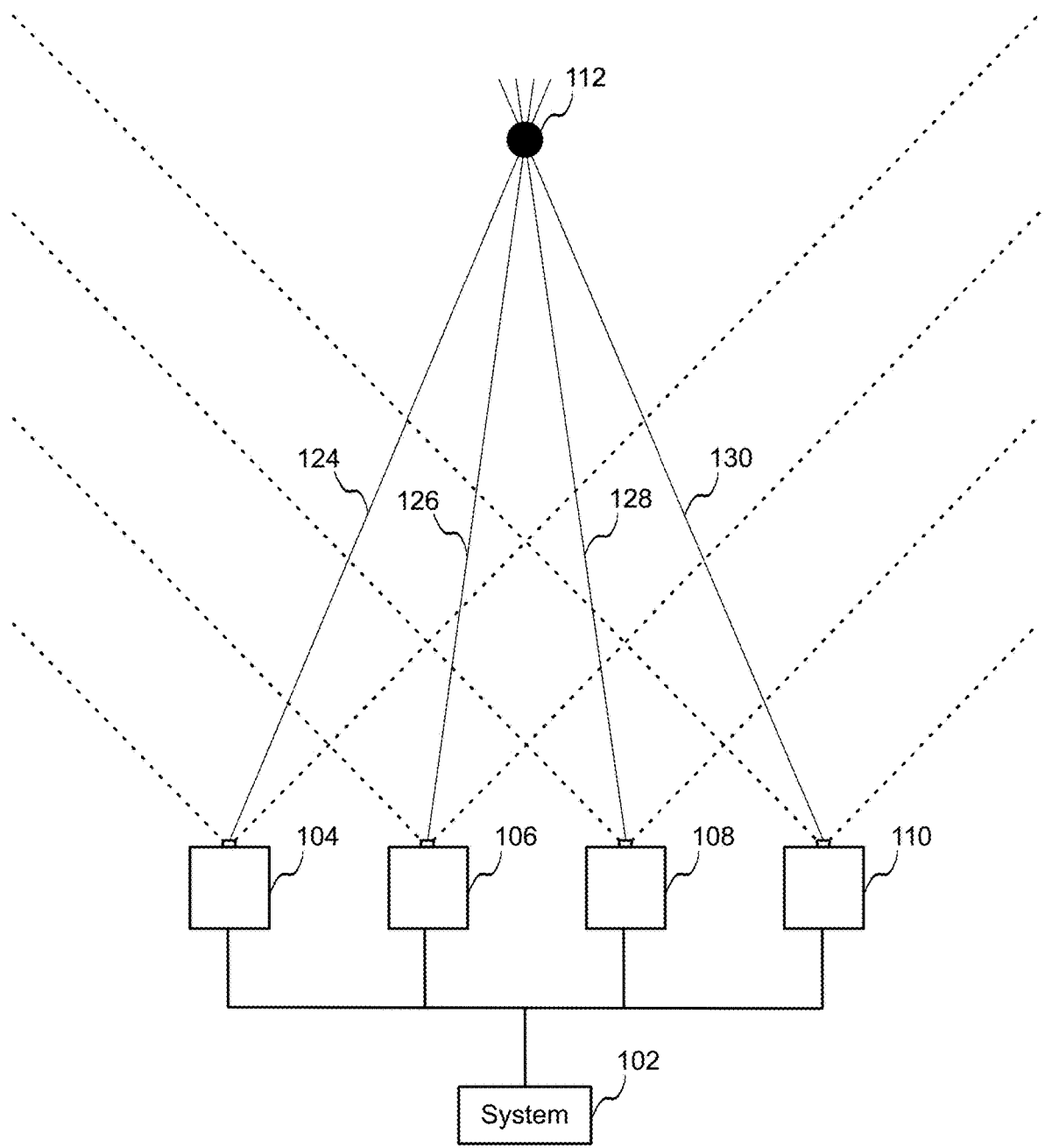
FIG. 1 is a block diagram of an example environment for calibrating cameras in a live action scene, which may be used for embodiments described herein.

FIG. 1 is a block diagram of an example environment 100 for calibrating cameras in a live action scene, which may be used for embodiments described herein. Shown is a system 102, cameras 104, 106, 108, and 110, and reference point 112. As described in more detail below, system 102 receives videos including images from multiple cameras such as cameras 104-110. As described in more detail herein, system 102 utilizes cameras 104-110 to locate and track the reference points such as reference markers on the live action scene or set. In various example embodiments, reference points may be also referred to as reference markers. Embodiments described herein calibrate cameras 104-110, which improve the accuracy of system 102 locating and tracking reference points.

Each of cameras 104-110 has a field of view (indicated by dotted lines) that enables each camera to capture video and/or images of objects in a live action scene. In various embodiments, cameras 104-110 are stationary at the point of their calibration until they need to be moved for subsequent scene changes. Cameras 104-110 may be attached to tripods or other camera stabilizing equipment. In various embodiments, the positions of and orientations of cameras 104-110 may vary, and will depend on the particular implementation.

In various embodiments, if a particular camera is moved (e.g., used in another location of the set, used in another set, etc.), that camera may then recapture reference point 112 and/or capture and collect other reference points. System 102 may then recalculate the new position of the camera.

Cameras 104-110 may be any suitable cameras, including cameras dedicated to tracking reference points (e.g., active reference markers, passive reference markers, etc.). Such cameras may also include infrared cameras and other digital cameras. In some embodiments where a reference point is an active reference marker, the reference marker emits an infrared light. At least some cameras may have a narrow-pass filter to detect and capture the infrared light, which system 102 analyzes to compute the location of the active reference marker. Such as an active reference marker may be used to implement any one or of reference points described herein.

In various embodiments, objects may include scene props and actors, and these objects may have reference points such as reference point 112 attached to them for tracking live action tracking purposes. In various embodiments, the reference points may be any type of reference or position that system 102 identifies using any suitable approach and techniques. Such techniques may vary and the particular techniques used will depend on the particular implementation. For example, system 102 may use techniques involving image recognition, pattern recognition, reference markers, radio-frequency identification (RFID), wireless beacons, etc.

As described in more detail herein, system 102 causes cameras 104-110 to project respective rays 124, 126, 128, and 130 into the space and through reference point 112. For ease of illustration, one reference point 112 is shown. The particular number of reference points in a given live action scene may vary and will depend on the implementation. For example, there may be tens or hundreds of reference points on a given live action scene. In some embodiments, system 102 may cause cameras 104-110 to also project other respective rays into the space and through other reference points.

In various embodiments, system 102 associates each reference point in a given image with a ray from each camera of a set of different cameras that capture such reference points in their respective image(s). System 102 searches for and identifies intersections of rays 124-130 to identify particular reference points. In various embodiments, system 102 analyzes information associated with each intersection to identify the respective reference point, respective rays that intersect the reference point, and respective cameras associated with such rays.

Rays 124-130 may also be referred to as epipolar lines 124-130. Each epipolar line 124-130 is a straight line of intersection in an epipolar plane, where each epipolar line 124-130 represents a different point of view of a respective camera. In various scenarios, there may be tens of cameras that capture tens or hundreds of reference points. In various scenarios, system 102 may perform thousands or millions of calculations to analyze different intersections associated with different references points in a live action scene.

As system 102 locates the different reference points such as reference point 112 based on the epipolar lines 124-130, system 102 computes or solves for the 3D coordinates and orientation of each of cameras 104-110. Such epipolar geometry describes the relationships between different cameras 104-110, including their respective points of view.

For ease of illustration, one system 102 and four cameras 104-110 are shown. System 102 may represent multiple systems, and cameras 104-110 may represent any number of cameras. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 or any suitable processor or processors associated with system 102 may facilitate performing the embodiments described herein. Various example embodiments directed to environment 100 for calibrating cameras 104-110 are described in more detail herein.

Figure 2:
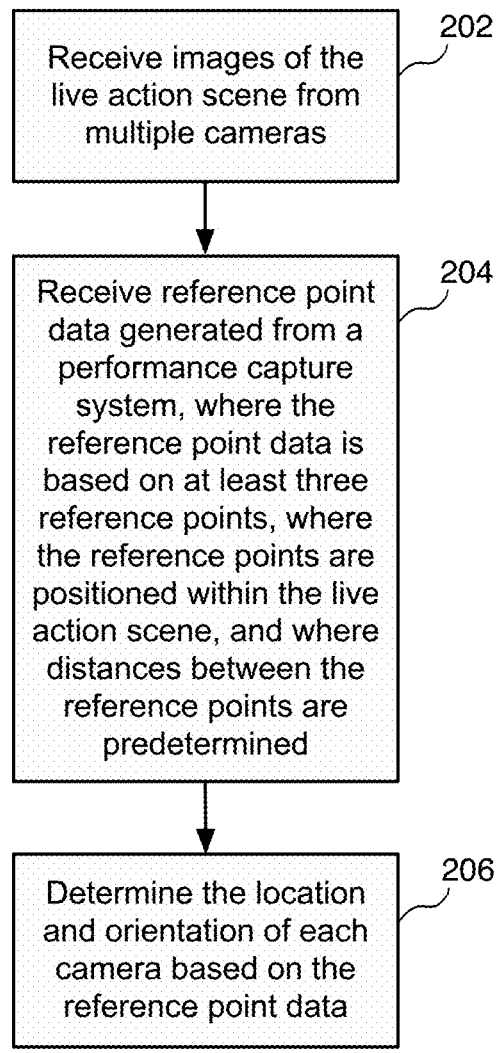
FIG. 2 is an example flow diagram for calibrating cameras in a live action scene, according to some embodiments.

FIG. 2 is an example flow diagram for calibrating cameras in a live action scene, according to some embodiments. Referring to both FIGS. 1 and 2, a method is initiated at block 202, where a system such as system 102 receives images of the live action scene from multiple cameras. Example embodiments of such images are described in more detail below in connection with FIG. 3. Subsequent steps of FIG. 2 are described below in connection with FIG. 3.

Figure 3:
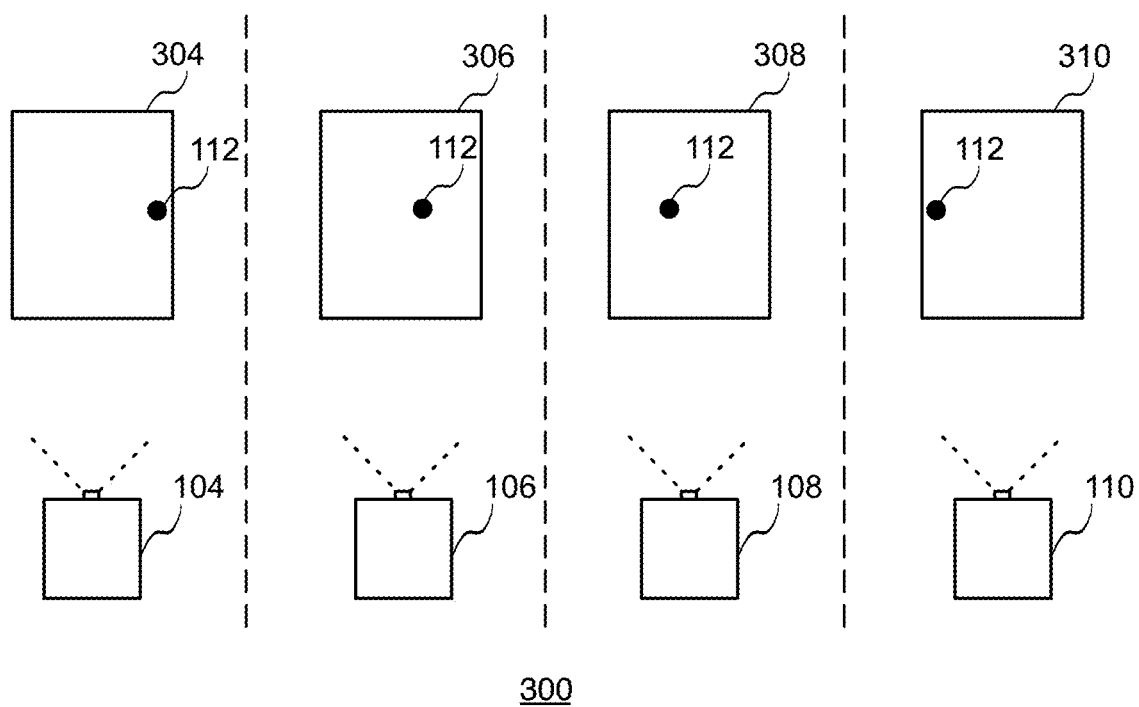
FIG. 3 is a block diagram of an example scenario including a reference point captured by cameras in a live action scene, according to some embodiments.

FIG. 3 is a block diagram of an example scenario 300 including a reference point captured by cameras in a live action scene, according to some embodiments. Shown are cameras 104, 106, 108, and 110, each of which are capturing respective images 304, 306, 308, and 310 of reference point 112. While one reference point 112 is shown, the number of reference points captured by a given camera may vary, and the number will depend on the particular implementation.

As shown, images 304-310 show reference point 112 in a different location in the different image frames depending on the relative location of reference point 112 to the respective camera in the physical live action scene. In various embodiments, system 102 sends images 304-310 to a performance capture system, which may be remote to system 102 or integrated with system 102.

In various embodiments, cameras 104-110 have a known projection matrix for mapping reference points in three-dimensions (3D) to two-dimensional (2D) points in an image. In various embodiments, system 102 identifies reference point 112 in 2D in an image frame from 3D in the live action scene. System 102 then causes each camera to project a ray into the space and through reference point 112 and/or other references points in the image. As such, all the cameras see the same reference point 112 in a different place in their respective 2D image frame. As shown, cameras 104-110 see the same reference point 112 but in different positions in their respective image frame. The rays projected by the different cameras 104-110 intersect at reference point 112 in the 3D space, and system 102 computes these intersections.

As indicated above, while some embodiments are described herein in the context of a single reference point, these embodiments and others also apply to multiple reference points. For example, in various embodiments, each camera may capture 3 reference points attached to a wand.

System 102 may analyze each reference point individually and together as a group, including their relative positions from each other. Further examples of such embodiments are described in more detail herein.

Referring again to FIG. 2, at block 204, system 102 receives reference point data generated from a performance capture system. The reference point data may be based on at least reference point 112. For ease of illustration, as indicated above, one reference point 112 is shown for the calibration of cameras 104-110. There may any number of reference points used for the calibration of cameras 104-110. For example, in various embodiments, the reference point data is based on at least three reference points in the live action scene. In various embodiments, the distances between the reference points are predetermined. Example embodiments directed to the distances between the reference points are described in more detail herein. In various embodiments, the three reference points are arranged in a predetermined pattern. In various embodiments, the three reference points are attached to one or more moveable forms. In various embodiments, the three reference points are attached to a predetermined form. For example, such a predetermined form may be a rigid mobile form such as a wand, etc., which a person can carry and place in the live action scene. Example embodiments directed to the calibration of cameras using multiple reference points arranged in a predetermined pattern and attached to a predetermined form are described below in connection with FIGS. 4-9.

At block 206, system 102 determines the location and orientation of each camera based on the reference point data. In various embodiments, the locations of the at least three reference points in the live action scene are determinable, as described in various embodiments described herein. In various embodiments. system 102 may determine extrinsic information and intrinsic information. In various embodiments, the location and orientation of the cameras may be referred to as extrinsic information. In various embodiments, other camera information or attributes such as lens focal length may be referred to camera intrinsic information. For example, while system 102 may determine the location and orientation of a given camera (extrinsic information), system 102 may also determine the lens focal length of the camera. As described in more detail herein, system 102 may utilize the wand described in FIG. 4 to determine extrinsic information (e.g., location, orientation, etc.). System 102 may also utilize the tiara described in FIG. 7 to determine extrinsic information (e.g., location, orientation, etc.) and/or intrinsic information (e.g., lens focal length, etc.).

In various embodiments, in addition to system 102 determining a location and orientation of each camera based on the reference point data, system 102 may also determine the location and orientation of each camera based on any one or more location techniques. For example, in some embodiments, system 102 may triangulate each camera of the set of cameras based on the reference point data. In various embodiments, to triangulate each camera, system 102 locates the reference points in one or more images of the images. System 102 then computes an aspect ratio of multiple reference points in the one or more images. In embodiments where system 102 analyzes a group of 3 reference points on a wand, for example. Example embodiments directed to a wand with reference points are described below in connection with FIG. 4. In various embodiments, system 102 computes the aspect ratio of the three reference points in the one or more images. System 102 then triangulates each camera based on the aspect ratio. System 102 determines the location of each camera based on relative angles to each reference point in the reference point data.

In some embodiments, system 102 may perform trilateration on each camera of the set of cameras based on the reference point data. In various embodiments, to perform a trilateration on each camera, system 102 locates the reference points in one or more images of the images. System 102 then computes an aspect ratio of multiple reference points in the one or more images. In various embodiments, system 102 may analyze a group of 3 reference points on a wand, for example. In various embodiments, system 102 computes the aspect ratio of the three reference points in the one or more images. System 102 then performs trilateration on each camera based on the aspect ratio. System 102 determines the location of each camera based on relative distances to each reference point in the reference point data.

In various embodiments, the calibration process uses the camera stereo and wand to determine the volumetric position. Furthermore, in various embodiments, the system may utilize feedback as part of the calibration. For example, in some embodiments, the system may utilize one or more phase-locked loop (PLL) techniques, where once calibrated, the system may track any changes to camera locations.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
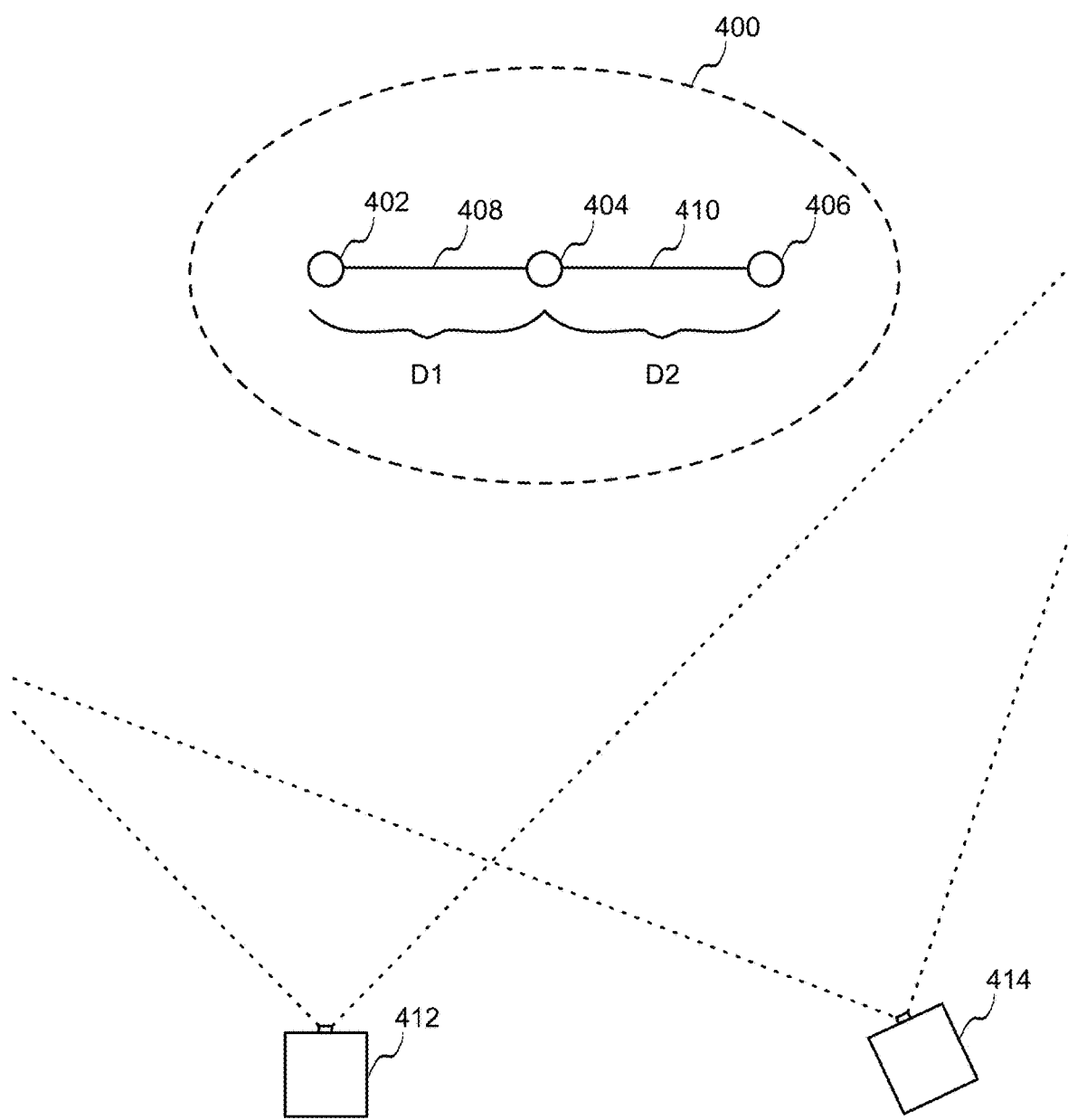
FIG. 4 is a block diagram of a group of reference points in a live action scene, where the reference points are arranged in a straight line, according to some embodiments.

FIG. 4 is a block diagram of a group 400 of reference points in a live action scene, where the reference points are arranged in a straight line, according to some embodiments. As shown, group 400 includes reference points 402, 404, and 406. In various embodiments, reference points 402, 404, and 406 form a straight line. In some embodiments, reference points 402, 404, and 406 may be symmetrical, as shown. In some embodiments, reference points 402, 404, and 406 may be asymmetrical. For example, the distance between reference points 402 and 404 may be different from the distance between reference points 404 and 406. Example embodiments directed to the distances between the references points are described in more detail herein.

In various embodiments, reference points 402, 404, and 406 are attached to a rigid form. For example, in the example embodiment shown, reference points 402, 404, and 406 are attached to respective rigid arms 408 and 410, which form a straight line of a wand. As such, group 400 of reference points may also be referred to as wand 400. In various embodiments, the rigid form is a rigid mobile form such as wand 400, where a person may walk rigid form onto the set of the live action seen and place the rigid mobile form in the live action scene. As such various cameras may capture reference points 402, 404, and 406 in images for calibration. In some embodiments, the rigid mobile form may be left in the live action scene for subsequent calibration (e.g., calibration of cameras added to the live action scene, recalibration of cameras moved in the live action scene, etc.). While three reference points 402, 404, and 406 are shown, the number of reference points on wand 400 may vary, and the number will depend on the particular implementation. For example, there may be 4 references points or 5 reference points, etc., attached to wand 400.

In various embodiments, reference points 402, 404, and 406 of wand 400 are determinable, known, or predetermined, and their distances from each other are invariant or fixed (e.g., do not change). In other words, the absolute length of wand 400 is known, including distances D1 and D2. In the example shown, in various embodiments, reference points 402, 404, and 406 of wand 400 are equidistant, were the distance D1 between reference point 402 and reference point 404 is substantially equal to the distance D2 between reference point 404 and reference point 406.

In some embodiments, system 102 collects thousands frames from cameras 412 and 414 for one calibration of these cameras. In some embodiments, system 102 may analyze the reference points of wand 400 at different locations and orientations in the live action scene in order to optimize calibration measurements. In various embodiments, by having at least three reference markers 402-406, system 102 can accurately compute the orientation of wand 400 regardless of its relative orientation to a given camera.

Figure 5:
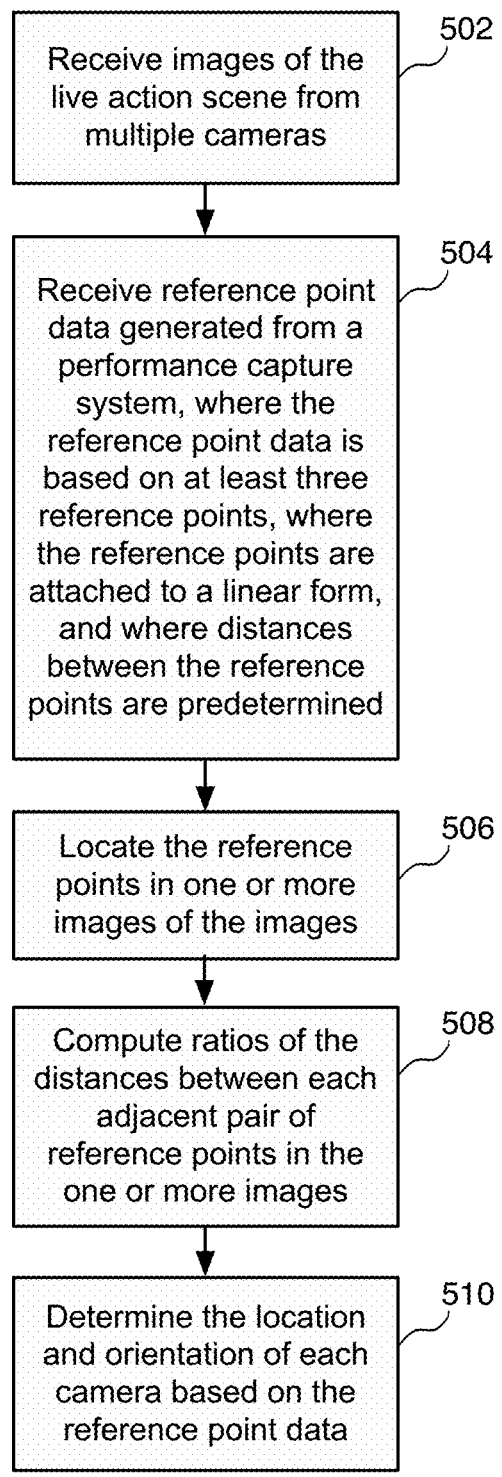
FIG. 5 is an example flow diagram for calibrating cameras in a live action scene, according to some embodiments.

FIG. 5 is an example flow diagram for calibrating cameras in a live action scene, according to some embodiments. Referring to both FIGS. 1, 4, and 5, a method is initiated at block 502, where a system such as system 102 receives images of the live action scene from multiple cameras. Example embodiments of such images are described in more detail below in connection with FIG. 6. Subsequent steps of FIG. 5 are described below in connection with FIG. 6.

Figure 6:
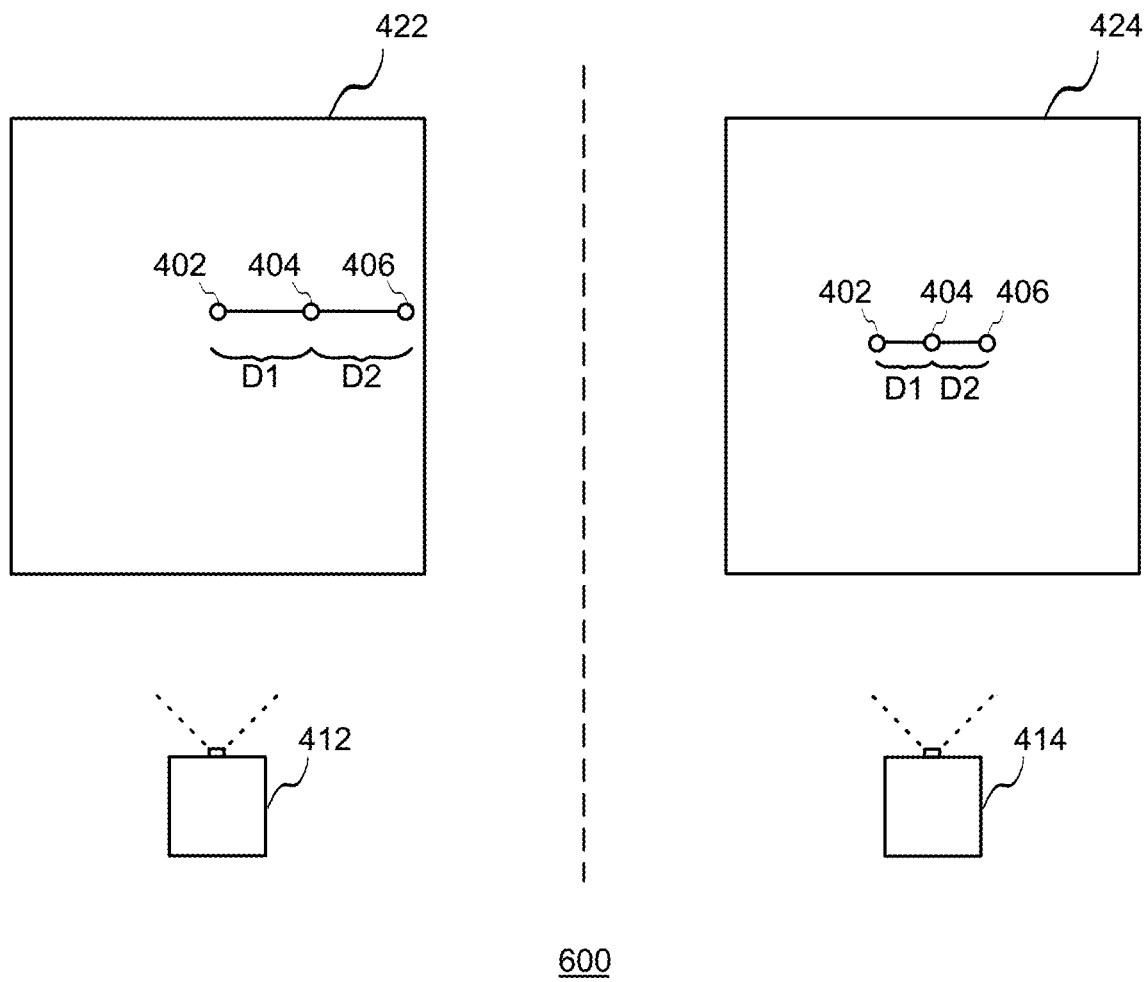
FIG. 6 is a block diagram of an example scenario including reference points in images captured by cameras in a live action scene, according to some embodiments.

FIG. 6 is a block diagram of an example scenario 600 including reference points in images captured by cameras in a live action scene, according to some embodiments. Shown are cameras 412 and 414, each of which are capturing respective images 422 and 424 of reference points 402, 404, and 406.

In various embodiments, the distances between pairings of reference points of the at least three reference points are predetermined. In this example embodiment, while distances D1 and D2 are equidistant in the 3D space, distances D1 and D2 form an aspect ratio in a 2D image, where distances D1 may differ from distance D2 in the 2D image depending on the point of view of a given camera. For example, images 422 and 424 show reference point 112 in a different location in the different image frames depending on the relative location of reference points 402, 404, and 406 to the respective camera 412 or 414 in the physical live action scene. As shown, comparing images 422 and 424, the reference points 402, 404, and 406 in image 422 are farther apart from each other in image 422 compare to their relative locations in image 224, where there may be some foreshortening due to the camera angle.

In various embodiments, system 102 computes the distance between each pairing of reference points 402-406, including all combinations. In some embodiments, system 102 generates a graph of the distance between each reference point to every other reference point of wand 400. System 102 computes or ascertains the location of each of the reference points of wand 400 and the orientation of the reference points of wand 400. Based on the location and orientation of reference points 402-406, system 102 computes the location and orientation of cameras 412 and 414 and any other cameras capturing images of reference points 402-406.

In various embodiments, system 102 sends images 422 and 424 to a performance capture system, which may be remote to system 102 or integrated with system 102. In various embodiments, system 102 computes or ascertains the location and orientation of each camera (e.g., camera 412, camera 414, etc.) based on the aspect ratio of distances D1 and D2.

In various embodiments, the distances D1 and D2 between pairings of reference points 402-406 are changeable. For example, distances D1 and D2 may be set at 1 inch each or may be changed to be set at 2 inches each, 5 inches each, etc. While the physical distances D1 and D2 associated with reference points 402-406 may be equidistance, they may also be different. For example, distance D1 may be set to 3 inches while distance D2 may be set to 6 inches. The exact distances D1 and D2 may vary, depending on the particular implementation.

In various embodiments, as long as the distances D1 and D2 are predetermined, system 102 may carry out embodiments described herein based on those known distances. In some embodiments, the system distances D1 and D2 may be set based on reference points 402-406 being attached to the rigid form (e.g., wand) at different points.

Figure 7:
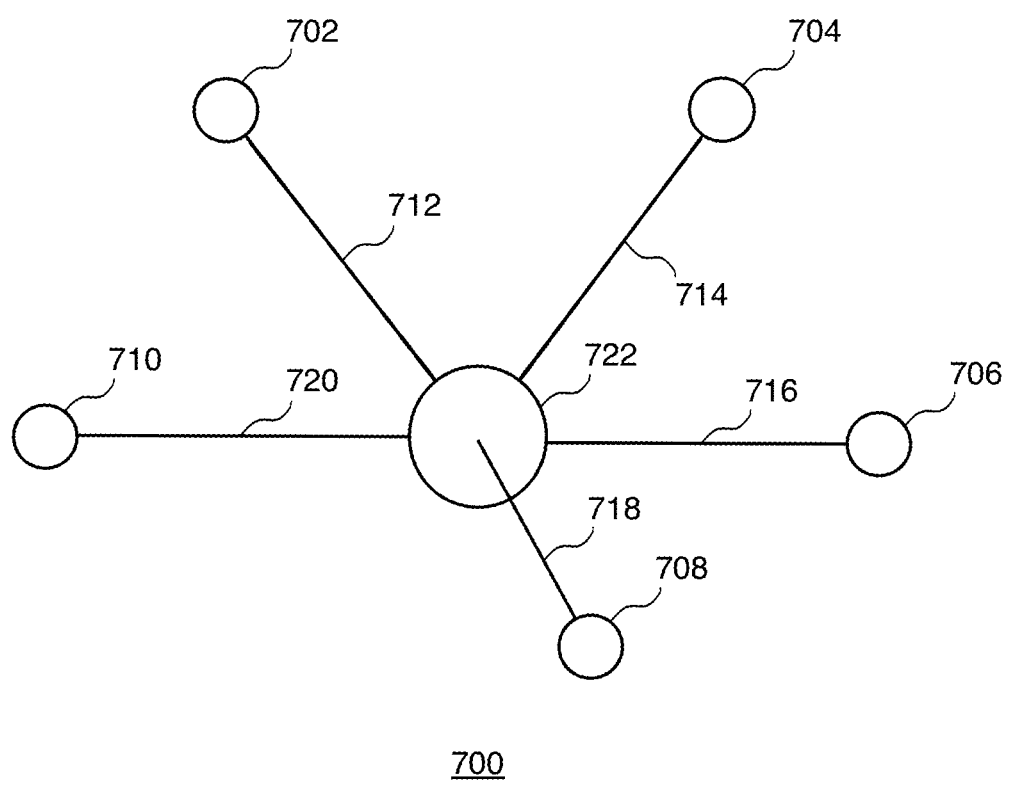
FIG. 7 is a block diagram of an assembly that includes reference points arranged in a 3D form, according to some embodiments.

While reference points 402-406 are shown to be arranged in a straight line, the particular arrangement and relative positions of the reference points may vary and will depend on the particular implementation. FIG. 7 below shows a different configuration or constellation of reference points in a reconfigurable assembly.

Referring again to FIG. 5, at block 504, system 102 receives reference point data generated from a performance capture system. In various embodiments, the reference point data is based on at least three reference points 402, 404, and 406 in the live action scene. For ease of illustration, as indicated above, three reference points 402, 404, and 406 are shown for the calibration of cameras 412 and 414. There may any number of reference points used for the calibration of cameras 412 and 414. In various embodiments, the three reference points are attached to a predetermined form. For example, in various embodiments, the three reference points are attached to a linear form or straight form, as shown. As described in more detail herein, the distances between the reference points are predetermined. In various embodiments, such a straight form may be a rigid mobile form such as a wand, etc., which as person can carry and place in the live action scene. As such, the three reference points 402, 404, and 406 form a straight line. In some embodiments, a person may wave a wand in the live action scene, where the performance capture system of system 102 generates a point cloud based on camera detection of the reference points. In some embodiments, the reference point data may include two-dimensional coordinates of the reference points.

At block 506, system 102 locates the reference points in one or more images of the images. In various embodiments, the locations of the reference points in a given image is determinable. For example, in some embodiments, system 102 may determine the location of each reference point relative to any one or more other references points based on pixel locations in the image. For example, in various embodiments, the distance between pairs of reference points are predetermined, as described herein. From computed ratios between pairs of reference points, system 102 may ascertain ratios between different pairs of reference points. The system may then determine the orientation and location of each reference point in the image. Other example embodiments directed to locating reference points in images are describe in more detail herein.

At block 508, system 102 computes ratios of the distances between each adjacent pair of reference points in the one or more images. Example embodiments are described in more detail herein, such as in FIG. 4 for example.

At block 510, system 102 determines the location and orientation of each camera based on the reference point data. In various embodiments, in addition to system 102 determining a location and orientation of each camera based on the reference point data, system 102 may also determine the location and orientation of each camera based on any one or more location techniques. In various embodiments, system 102 may determine such locations and orientations according to the techniques described herein. For example, in some embodiments, system 102 may triangulate each camera of the set of cameras based on the reference point data. System 102 may also perform trilateration on each camera of the set of cameras based on the reference point data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 7 is a block diagram of an assembly 700 that includes reference points arranged in a 3D form, according to some embodiments. As shown, assembly 700 includes reference points 702, 704, 706, 708, and 710. In various embodiments, reference points 702-710 form a cluster of reference points, where reference points 702-710 form a 3D pattern. In various embodiments, the reference points are attached to a 3D assembly. In various embodiments, the 3D assembly is a rigid mobile form, which a person can carry and place in the live action scene. As described in more detail herein, in various embodiments, the distances between one or more pairs of reference points vary. In various embodiments, the distances between one or more pairs of reference points are different. In various embodiments, the distances between one or more pairs of reference points are changeable.

In various embodiments, one or more of the reference points described herein, may be implemented by light emitting diodes (LEDs). In some embodiments, the colors of the LEDs may be the same. In some embodiments, the colors of the LEDs may vary. In some embodiments, the LEDs of the references points may be detected by regular cameras and/or infrared cameras.

In the example embodiment shown, reference points 702, 704, 706, 708, and 710 are attached to respective rigid arms 712, 714, 716, 718, and 720. Rigid arms 712, 714, 716, 718, and 720 attach to a hub 722, and extend outward away from hub 722. Rigid arms 712, 714, 716, 718, and 720 may also be referred to as arms, extensions, stalks, or rods. The length of each rigid arm may vary. Also, the lengths of different rigid arm may be different. While rigid arms 712, 714, 716, 718, and 720 are shown as being straight. In some embodiments, one or more of rigid arms 712, 714, 716, 718, and 720 may be curved and/or bent. While five reference points 702, 704, 706, 708, and 710 are shown, the number of reference points in the cluster may vary, and will depend on the implementation. For example, there may be 4 reference points or 5 reference points, etc., attached to the wand. In various embodiments, the distances between pairings of the reference points are predetermined. This would be a similar case in a scenario with assembly 700 as it would be in a scenario with group 400 or wand 400 in FIGS. 4 and 6.

In various embodiments, system 102 computes the distance between each pairing of reference points 702-710, including all combinations. In some embodiments, system 102 generates a graph of the distance between each reference point to every other reference point of assembly 700 in of the rigid body. System 102 computes or ascertains the location of each of the reference points of assembly 700 and the orientation of the cluster of reference points of assembly 700. Based on the location and orientation of reference points 702-710, system 102 may compute the location and orientation of each camera capturing images of reference points 702-710.

Figure 9:
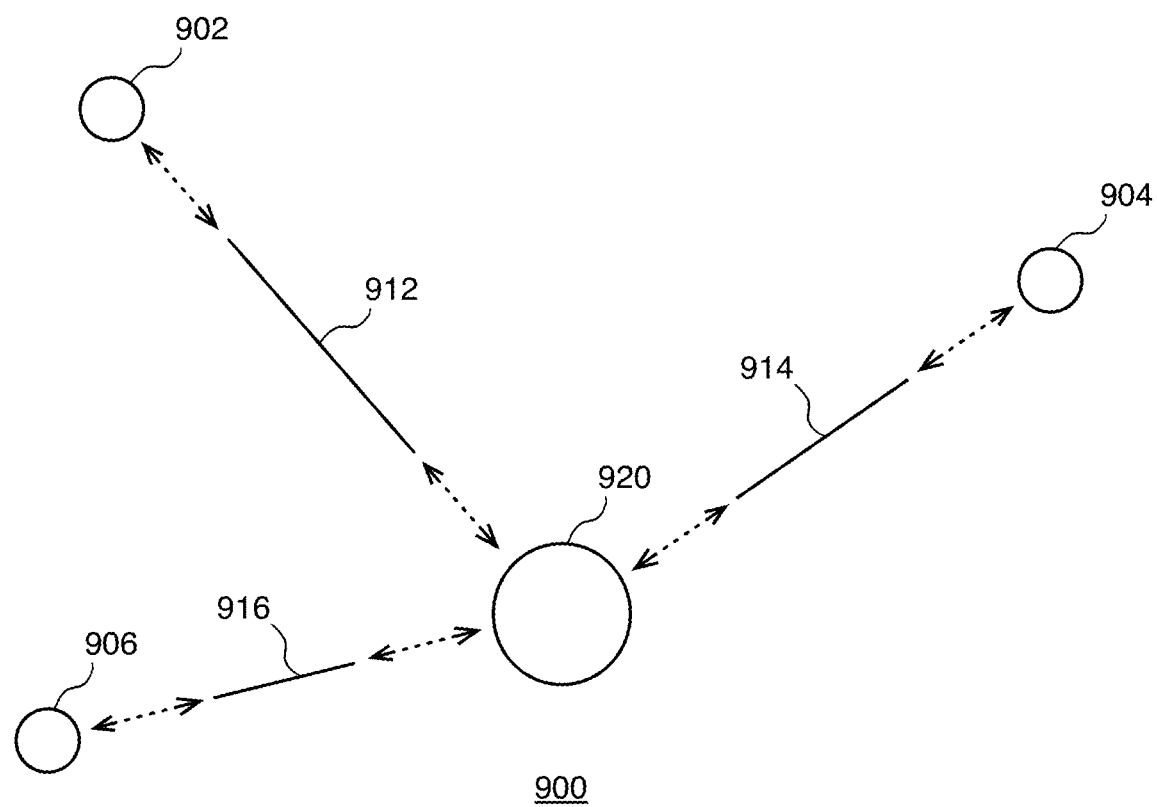
FIG. 9 is a block diagram of components including reference points that are reconfigurable to be arranged in a three-dimensional form, according to some embodiments.

While reference points 702-710 are shown to be arranged in a particular configuration, the particular arrangement and relative positions of the reference points may vary and will depend on the particular implementation. FIG. 9 below shows components of an assembly that may be reconfigured into different configurations or constellations of reference points.

Figure 8:
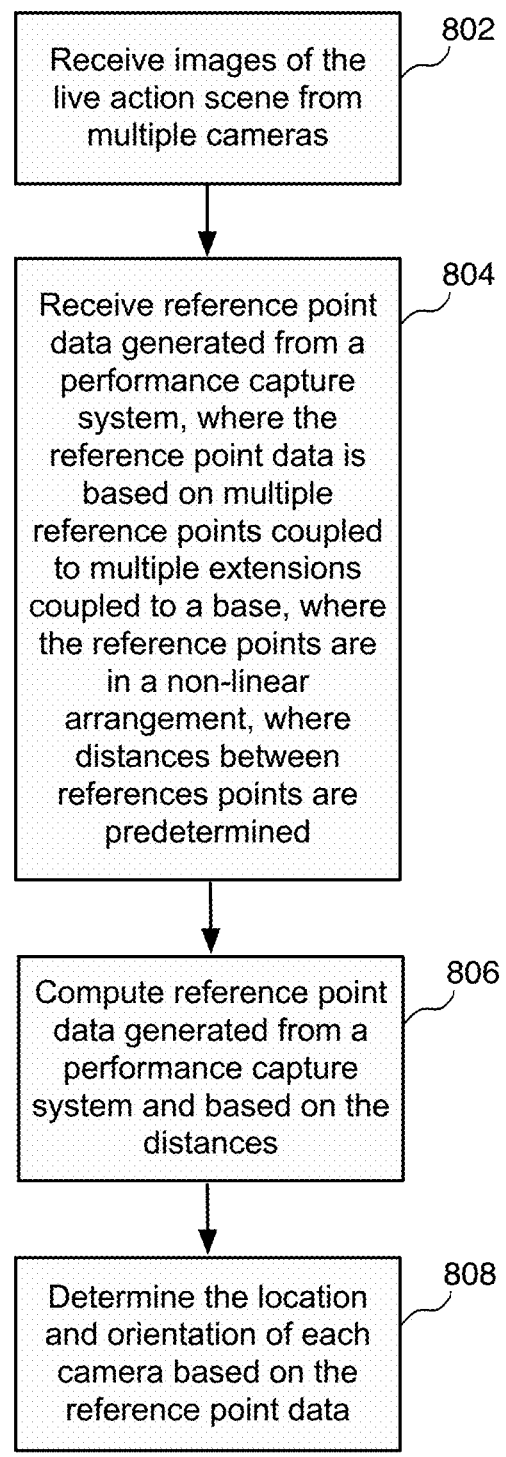
FIG. 8 is an example flow diagram for calibrating cameras in a live action scene, according to some embodiments.

FIG. 8 is an example flow diagram for calibrating cameras in a live action scene, according to some embodiments. Referring to both FIGS. 1, 7, and 8, a method is initiated at block 802, where a system such as system 102 receives images of the live action scene from multiple cameras.

At block 804, system 102 receives reference point data generated from a performance capture system. In various embodiments, the reference point data is based on multiple reference points coupled to multiple extensions coupled to a base, as shown in FIG. 7, for example. In various embodiments, the reference points are in a non-linear arrangement, where distances between references points are predetermined.

In various embodiments, the reference point data is based on at least three reference points in the live action scene. In the example of FIG. 7, five reference points 702-710 are shown for the calibration of cameras. There may any number of reference points used for the calibration of cameras. In various embodiments, reference points 702-710 are attached to 3D assembly 700, as shown. As indicated above, in various embodiments, such a 3D assembly may be a rigid mobile form such as a cluster form, a tiara form, etc., which a person can carry and place in the live action scene.

At block 806, system 102 computes reference point data generated from a performance capture system and based on the distances. Embodiments directed to computing reference point data are described in more detail herein.

At block 808, system 102 determines the location and orientation of each camera based on the reference point data. In various embodiments, in addition to system 102 determining a location and orientation of each camera based on the reference point data, system 102 may also determine the location and orientation of each camera based on any one or more location techniques. In various embodiments, system 102 may determine such locations and orientations according to the techniques described herein. For example, in some embodiments, system 102 may triangulate each camera of the set of cameras based on the reference point data. System 102 may also perform trilateration on each camera of the set of cameras based on the reference point data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

FIG. 9 is a block diagram of components 900 including reference points that are reconfigurable to be arranged in a 3D form, according to some embodiments. As shown, components 900 includes reference points 902, 904, and 906, which are each configured to couple to respective rigid arms 912, 914, and 916. Furthermore, rigid arms 912-916 are configured to couple to a base 920. Once assembled, components 900 are configured in a 3D assembly that is a rigid mobile form, which a person can carry and place in the live action scene. As a result, reference points 902-906 form a 3D pattern.

In various embodiments, the distances between pairings of the reference points are predetermined. In the example embodiment shown, rigid arms may have different lengths. As such, in various embodiments, the distances between pairings of reference points 902-906 are changeable. Reference points 902-906 couple to respective rigid arms 912-916, which couple to hub 920, and extend outward away from hub 920. Because the lengths of rigid arms 912, 914, and 916 may vary, the distance between an given reference point and hub 920 may vary, depending on the particular implementation. While three reference points 902-906 are shown, the number of reference points in the cluster may vary, depending on the particular implementation.

In various embodiments, each rigid arm 912, 914, and 916 may couple or attach to hub 920 at different locations and a different angles. As such, the cluster of reference points may extend in different directions. Different techniques may be used to couple references points 902-906 to respective rigid arms 912-916, and to couple rigid arms 912-916 to hub 920. For example, in some embodiments, references points 902-906 may each have a hole for receiving a respective rigid arm 912-916, and hub 920 may have multiple holes for receiving multiple rigid arm 912-916. In some embodiments, each rigid arm 912-916 may be threaded at the ends, and the inside of the holes of the references points 902-906 and hub 920 may also be threaded. As such, rigid arms 912-916 may be inserted and screwed into respective references points 902-906 and hub 920. In some embodiments, the components are not threaded, where rigid arms 912-916 may be inserted into respective references points 902-906 and hub 920 and held in by friction or other techniques.

Figure 10:
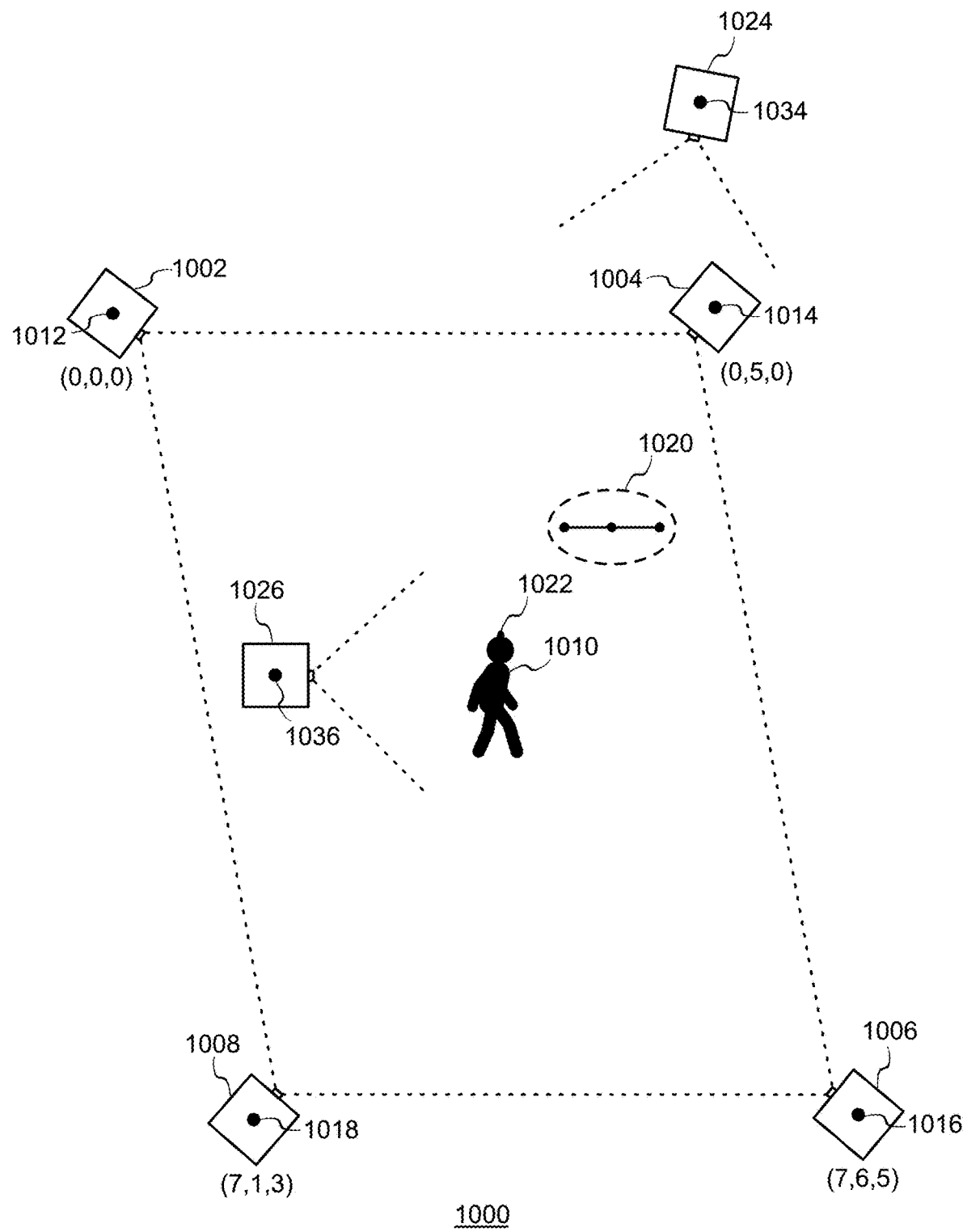
FIG. 10 is a block diagram of an example environment for calibrating cameras in a live action scene, which may be used for embodiments described herein.

FIG. 10 is a block diagram of an example environment 1000 for calibrating cameras in a live action scene, which may be used for embodiments described herein. As shown, cameras 1002, 1004, 1006, and 1008 capture video or images of objects such as person 1010 in their fields of view of environment 1000. In various embodiments, one or more reference points are attached to at least some of the cameras in environment 1000. For example, reference points 1012, 1014, 1016, and 1018 are attached to respective cameras 1002, 1004, 1006, and 1008.

In various embodiments, cameras 1002-1008 may be hidden or camouflaged such that these and other cameras do not capture images that visibly show these cameras. As such, system 102 locates and calibrates these cameras based on the reference points attached to them.

As described in more detail below, environment 1000 may have multiple levels or layers of cameras for capturing different aspects of environment 1000. For example, in various embodiments, cameras 1002, 1004, 1006, and 1008 may operate on a first level or layer. In this context, two or more cameras operating at the same level or layer may mean operating at the same height (e.g., 4 feet above ground, 5 feet above ground, etc.) or same height range (e.g., between 1 foot above ground to 8 feet above ground, etc.). The particular levels or layers may vary, depending on the particular implementation.

In various embodiments, cameras 1002-1004 are stationary, orientated in different directions, and have broad overlapping fields of view to capture video or images of much of environment 1000. Cameras 1002-1004 capture various reference points in their fields of view. The particular distance between cameras 1002-1004 and their overall coverage of the set may vary, and will depend on the particular implementation.

In this example embodiment, cameras 1002-1004 may capture reference points 1020 for calibration purposes. In some embodiments, reference points 1020 may be implemented in accordance with embodiments described herein in association with the group 400 of reference points 402-406 of FIG. 4. In some embodiments, reference points 1020 may be implemented in accordance with embodiments described herein in association with the group 600 of FIG. 6.

Cameras 1002-1004 may also capture any combination of references points 1012-1018 associated with respective cameras 1002-1008. Cameras 1002-1004 may also capture reference point 1022 attached to person 1010. Once calibrated, each camera accurately locates the position of reference points in their fields of view.

As indicated above, environment 1000 may have multiple levels or layers of cameras for capturing different aspects of environment 1000. In various embodiments, environment 1000 may also include mobile cameras 1024 and 1026. Mobile cameras 1024 and 1026 being mobile may each operate in their own separate levels or layers and/or share levels or layers throughout environment 1000. For example, in various embodiments, mobile cameras 1024 and 1026 may operate at the same substantial layer with each other. In various embodiments, any one or more of mobile cameras 1024 and 1026 may operate at the same substantial layer as other cameras such as cameras 1002-1004. Reference points 1034 and 1036 are attached to respective cameras 1024 and 1026, which enable cameras 1024 and 1026 to locate and track each other when in each other's field of view. It may be possible for other cameras such as cameras 1008 and 1006 to also locate and track cameras 1024 and 1026 by tracking their respective references points 1034 and 1036. This may further optimize triangulation and determination of location of orientation of cameras, as more data is available to system 102. In various embodiments, each of cameras 1024 and 1026 being mobile may follow an actor and may have a narrower field of view, as these cameras may function to capture an actor (e.g., hero actor) more closely.

In various embodiments, system 102 computes the positions and orientation of cameras 1002-1008 based on the reference points 1020. As described in other example embodiments described herein, each camera of cameras 1002-1008 captures at least one image of reference points 1020. As indicated above, wand 400 of FIG. 4 may be used to implement reference points 1020. For example, before calibration, a person may enter the live action set and place references points 1020 (or wand 400) in a location that is in the field of view of cameras 1002-1008. Cameras 1002-1008 then each capture video or one or more images of references points 1020. System 102 then performs the calibration of cameras 1002-1008 by computing an aspect ratio between each pair of reference points 1020, and computes the location and orientation of cameras 1002-1008 based on the aspect ratios. The computed positions include the absolute location coordinates of cameras 1002-1008 in the physical space of the live action scene or set. System 102 computes the correct location in space, the correct scale, and the correct alignment.

As shown, cameras 1002-1008 are positioned at four corners in environment 1000. In this particular example scenario, camera 1002 is located at x,y,z coordinates (0,0,0), camera 1004 is located at x,y,z coordinates (0,5,0), camera 1006 is located at x,y,z coordinates (7,6,5), and camera 1008 is located at x,y,z coordinates (7,1,3). In some embodiments, the coordinates of a given camera may be associated with and calibrated to be at the optical center of the lens of the given camera. The actual part of the given camera associated with a coordinate may vary, and will depend on the particular implementation.

These coordinates are examples. The actual locations of cameras 1002-1008 in the live action scene may vary, and will depend on the particular implementation. Cameras 1024 and 1026 being mobile may be located at or may relocated to any particular location in environment 1000. Also, the particular coordinate system (e.g., Cartesian, polar, etc.) that system 102 uses in computations may vary, and will depend on the particular implementation.

In some embodiments, system 102 may calibrate cameras in a particular order. For example, system 102 may first calibrate two cameras such as cameras 1002 and 1004 having good angles and overlap in their fields of view. System 102 may compute the relative locations and orientations of the cameras from one to the other. System 102 may then calibrate other cameras such as cameras 1006 and 1008 in turn. In some embodiments, system 102 may start with any given pair and continue calibrating cameras pair-by-pair. This technique is beneficial in that any one or more cameras can be added to the overall group of cameras on the live action set. Such added cameras may be subsequently calibrated based on the calibration of existing cameras.

Embodiments described herein provide various benefits. For example, if cameras need to be recalibrated often, system 102 can quickly calibrate any already calibrated camera or newly added or moved camera to be calibrated based on existing calibrated cameras. This saves valuable set up time for filming on the live action film set or stage.

In various embodiments, in addition to system 102 calibrating cameras 1002-1008 based on reference points 1020, system 102 may also calibrate cameras 1002-1008 based on other known reference points such as those attached to cameras 1002-1008. For example, if system has computed relative locations of reference points 1012, 1014, and one or more of reference points 1020, system 102 may calibrate cameras 1006 and 1008 based on those reference points captured by cameras 1006 and 1008 using associated aspect ratios.

In some embodiments system 102 may also utilize one or more inertial measurement unit (IMU) sensors in each camera to estimate a location and orientation of each camera to supplement the calibration information. IMU sensors may include magnetometers, accelerometers, etc. The associated IMU measurements in combination with associated aspect ratio measurements helps system 102 to compute accurate orientation of cameras 1002-1008.

These additional techniques are beneficial in optimizing the calibration of cameras 1002-1008. By utilizing different calibration techniques, system 102 accurately calibrates the location and orientation of different cameras despite potential occlusion or referent points and varying lighting conditions.

In various embodiments, the images are taken by the cameras within a predetermined time frame. For example, in some embodiments, the predetermined time frame may be a predetermined number of hours (e.g., 1 hour, 10 hours, 24 hours, etc.), or predetermined number of days (e.g., 1 day, 7 days, 365 days, etc.). In some embodiments, the predetermined time frame may be a based on a predetermined condition. For example, a condition may be that the cameras being calibrated have not moved (e.g., changed location and orientation) since the beginning of the calibration process. For example, as long as the cameras have not moved, the cameras may continue to take images to be used for calibration. If and when a given camera moves, the cameras may continue to captures images, but system 102 will use such images in a new calibration based on the new or current positions of the cameras.

In some embodiments, system 102 performs embodiments described herein in real time. In some embodiments, system 102 need not perform some steps associated with embodiments described herein at the same time as the images are captured. This is because there may be some delay from the processing and workflow steps before calibration is completed.

Figure 11:
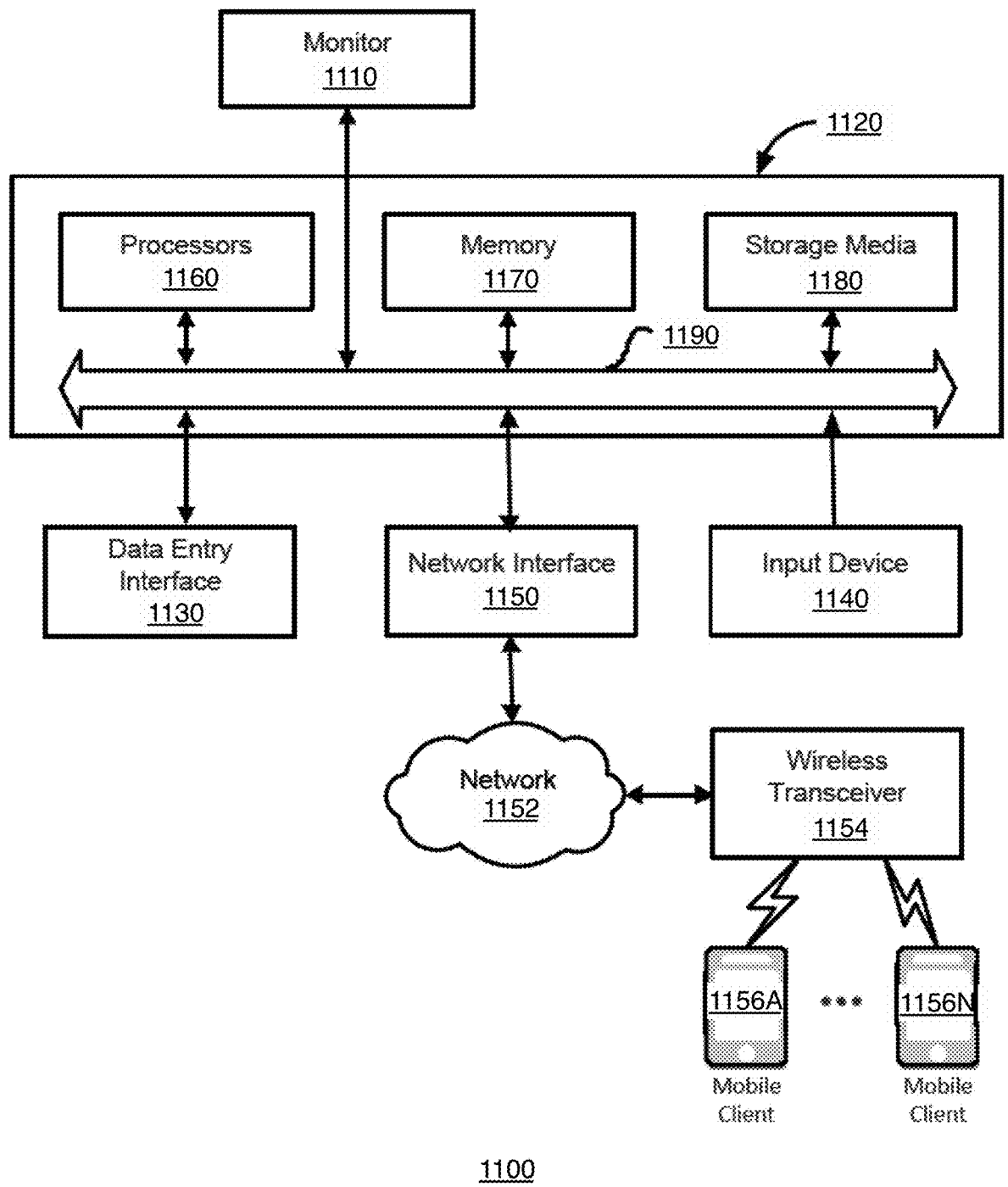
FIG. 11 is a block diagram of an example computer system, which may be used for embodiments described herein.

FIG. 11 is a block diagram of an example computer system 1100, which may be used for embodiments described herein. Computer system 1100 is merely illustrative and not intended to limit the scope of the claims. One of ordinary skill in the art would recognize other variations, modifications, and alternatives. For example, computer system 1100 may be implemented in a distributed client-server configuration having one or more client devices in communication with one or more server systems.

In one exemplary implementation, computer system 1100 includes a display device such as a monitor 1110, computer 1120, a data entry interface 1130 such as a keyboard, touch device, and the like, a user input device 1140, a network communication interface 1150, and the like. User input device 1140 is typically embodied as a computer mouse, a trackball, a track pad, wireless remote, tablet, touch screen, and the like. Moreover, user input device 1140 typically allows a user to select and operate objects, icons, text, characters, and the like that appear, for example, on the monitor 1110.

Network interface 1150 typically includes an Ethernet card, a modem (telephone, satellite, cable, ISDN), (asynchronous) digital subscriber line (DSL) unit, and the like. Further, network interface 1150 may be physically integrated on the motherboard of computer 1120, may be a software program, such as soft DSL, or the like.

Computer system 1100 may also include software that enables communications over communication network 1152 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 1152 may include a local area network, a wide area network, a wireless network, an Intranet, the Internet, a private network, a public network, a switched network, or any other suitable communication network, such as for example Cloud networks. Communication network 1152 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 1152 may communicate to one or more mobile wireless devices 1156A-N, such as mobile phones, tablets, and the like, via a base station such as wireless transceiver 1154.

Computer 1120 typically includes familiar computer components such as a processor 1160, and memory storage devices, such as a memory 1170, e.g., random access memory (RAM), storage media 1180, and system bus 1190 interconnecting the above components. In one embodiment, computer 1120 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 1170 and Storage media 1180 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

Figure 12:
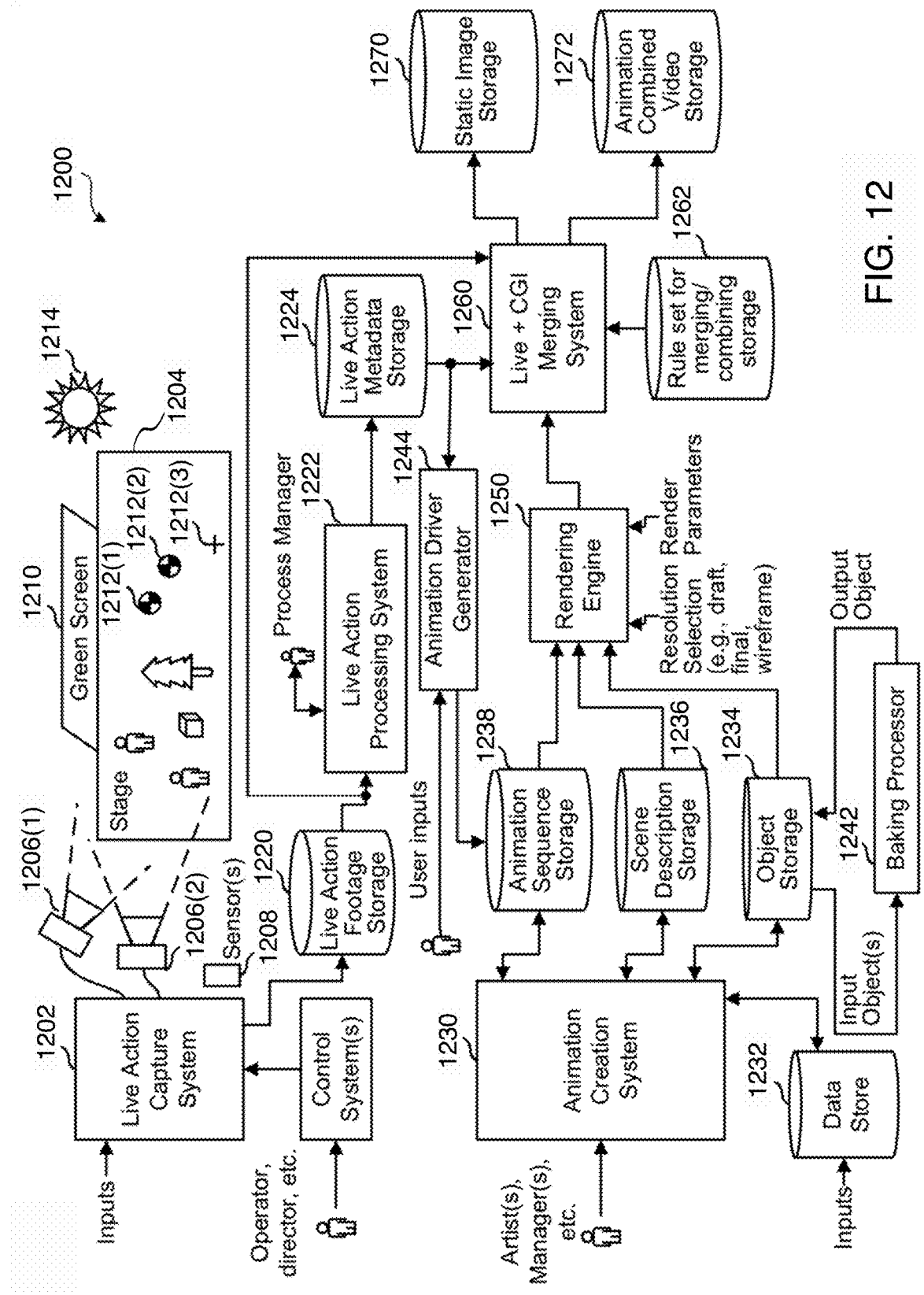
FIG. 12 is a block diagram of an example visual content generation system, which may be used to generate imagery in the form of still images and/or video sequences of images, according to some embodiments.

FIG. 12 is a block diagram of an example visual content generation system 1200, which may be used to generate imagery in the form of still images and/or video sequences of images, according to some embodiments. The visual content generation system 1200 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 1200 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1200 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence, and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 80 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, might specify positions of objects and/or lighting, as well as a camera viewpoint, and a camera view plane. Taking all of those as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine may perform ray tracing where a pixel color value is determined by computing which objects lie along a ray traced in the scene space from the camera viewpoint through a point or portion of the camera view plane that corresponds to that pixel. For example, a camera view plane may be represented as a rectangle having a position in the scene space that is divided into a grid corresponding to the pixels of the ultimate image to be generated. In this example, a ray defined by the camera viewpoint in the scene space and a given pixel in that grid first intersects a solid, opaque, blue object, and the given pixel is assigned the color blue. Of course, for modern computer-generated imagery, determining pixel colors, and thereby generating imagery, can be more complicated, as there are lighting issues, reflections, interpolations, and other considerations.

In various embodiments, a live action capture system 1202 captures a live scene that plays out on a stage 1204. The live action capture system 1202 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1206(1) and 1206(2) capture the scene, while in some systems, there might be other sensor(s) 1208 that capture information from the live scene (e.g., infrared cameras, infrared sensors, motion capture ("mo-cap") detectors, etc.). On the stage 1204, there might be human actors, animal actors, inanimate objects, background objects, and possibly an object such as a green screen 1210 that is designed to be captured in a live scene recording in such a way that it is easily overlaid with computer-generated imagery. The stage 1204 might also contain objects that serve as fiducials, such as fiducials 1212(1)-(3), that might be used post-capture to determine where an object was during capture. A live action scene might be illuminated by one or more lights, such as an overhead light 1214.

During or following the capture of a live action scene, the live action capture system 1202 might output live action footage to a live action footage storage 1220. A live action processing system 1222 might process live action footage to generate data about that live action footage and store that data into a live action metadata storage 1224. The live action processing system 1222 might include computer processing capabilities, image processing capabilities, one or more processors, program code storage for storing program instructions executable by the one or more processors, as well as user input devices and user output devices, not all of which are shown. The live action processing system 1222 might process live action footage to determine boundaries of objects in a frame or multiple frames, determine locations of objects in a live action scene, where a camera was relative to some action, distances between moving objects and fiducials, etc. Where elements are detected by sensor or other means, the metadata might include location, color, and intensity of the overhead light 1214, as that might be useful in post-processing to match computer-generated lighting on objects that are computer-generated and overlaid on the live action footage. The live action processing system 1222 might operate autonomously, perhaps based on predetermined program instructions, to generate and output the live action metadata upon receiving and inputting the live action footage. The live action footage can be camera-captured data as well as data from other sensors.

An animation creation system 1230 is another part of the visual content generation system 1200. The animation creation system 1230 might include computer processing capabilities, image processing capabilities, one or more processors, program code storage for storing program instructions executable by the one or more processors, as well as user input devices and user output devices, not all of which are shown. The animation creation system 1230 might be used by animation artists, managers, and others to specify details, perhaps programmatically and/or interactively, of imagery to be generated. From user input and data from a database or other data source, indicated as a data store 1232, the animation creation system 1230 might generate and output data representing objects (e.g., a horse, a human, a ball, a teapot, a cloud, a light source, a texture, etc.) to an object storage 1234, generate and output data representing a scene into a scene description storage 1236, and/or generate and output data representing animation sequences to an animation sequence storage 1238.

Scene data might indicate locations of objects and other visual elements, values of their parameters, lighting, camera location, camera view plane, and other details that a rendering engine 1250 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1230 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1234 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 1232 might be used to drive object presentation. For example, if an artist is creating an animation of a spaceship passing over the surface of the Earth, instead of manually drawing or specifying a coastline, the artist might specify that the animation creation system 1230 is to read data from the data store 1232 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1244 might read in live action metadata, such as data representing movements and positions of body parts of a live actor during a live action scene, and generate corresponding animation parameters to be stored in the animation sequence storage 1238 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1222. The animation driver generator 1244 might convert that movement data into specifications of how joints of an articulated CGI character are to move over time.

A rendering engine 1250 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 1250 might include computer processing capabilities, image processing capabilities, one or more processors, program code storage for storing program instructions executable by the one or more processors, as well as user input devices and user output devices, not all of which are shown.

The visual content generation system 1200 can also include a merging system 1260 (labeled "Live+CGI Merging System") that merges live footage with animated content. The live footage might be obtained and input by reading from the live action footage storage 1220 to obtain live action footage, by reading from the live action metadata storage 1224 to obtain details such as presumed segmentation in captured images segmenting objects in a live action scene from their background (perhaps aided by the fact that the green screen 1210 was part of the live action scene), and by obtaining CGI imagery from the rendering engine 1250.

A merging system 1260 might also read data from rule sets for merging/combining storage 1262. A very simple example of a rule in a rule set might be "obtain a full image including a two-dimensional pixel array from live footage, obtain a full image including a two-dimensional pixel array from the rendering engine 1250, and output an image where each pixel is a corresponding pixel from the rendering engine 1250 when the corresponding pixel in the live footage is a specific color of green, otherwise output a pixel value from the corresponding pixel in the live footage."

The merging system 1260 might include computer processing capabilities, image processing capabilities, one or more processors, program code storage for storing program instructions executable by the one or more processors, as well as user input devices and user output devices, not all of which are shown. The merging system 1260 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1260, such as modifying boundaries of segmented objects, inserting blurs to smooth out imperfections, or adding other effects. Based on its inputs, the merging system 1260 can output an image to be stored in a static image storage 1270 and/or a sequence of images in the form of video to be stored in an animated/combined video storage 1272.

Thus, as described, the visual content generation system 1200 can be used to generate video that combines live action with computer-generated animation using various components and tools, some of which are described in more detail herein. While the visual content generation system 1200 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 13:
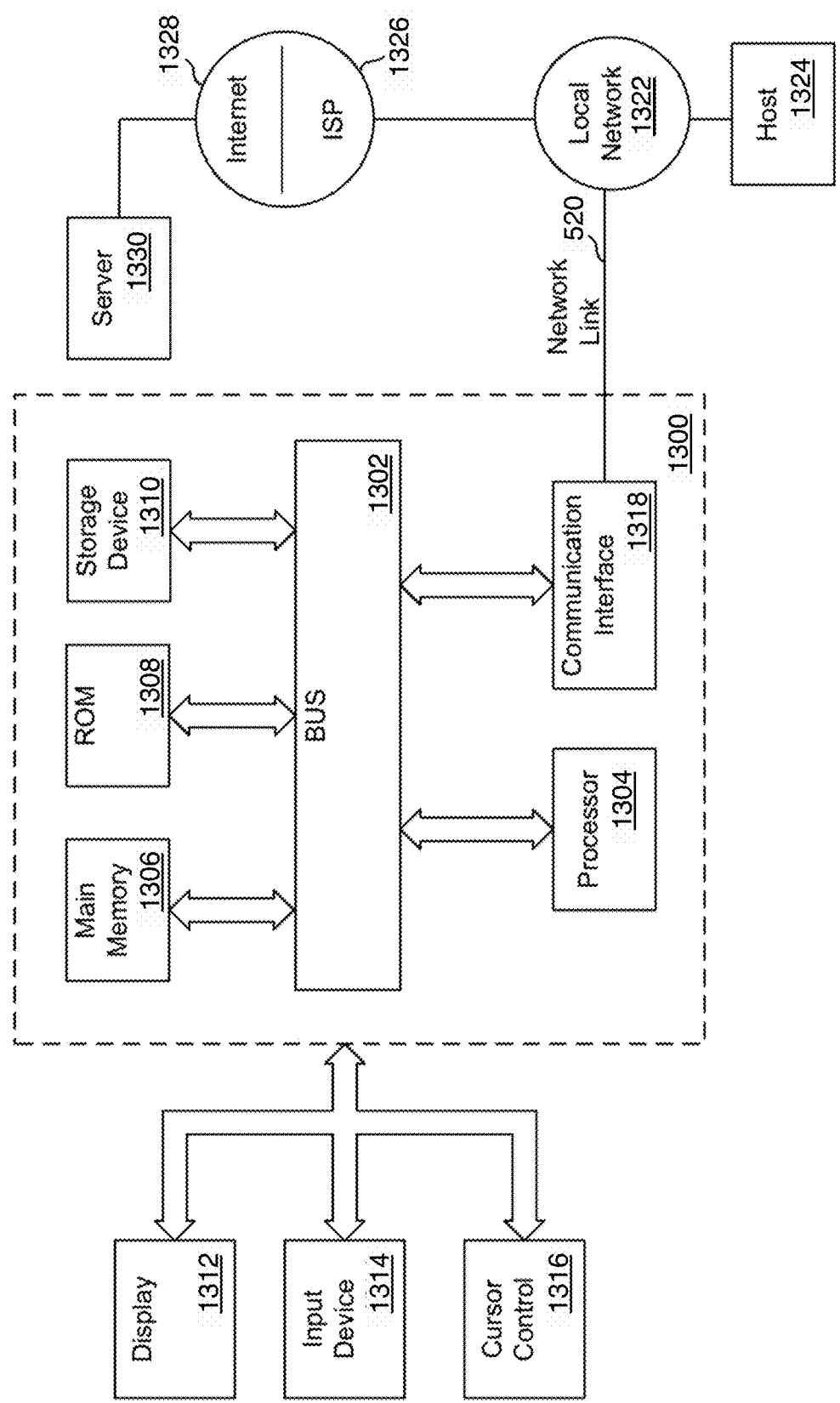
FIG. 13 is a block diagram of an example computer system, which may be used for embodiments described herein.

FIG. 13 is a block diagram of an example computer system 1300, which may be used for embodiments described herein. The computer system 1300 includes a bus 1302 or other communication mechanism for communicating information, and a processor 1304 coupled with the bus 1302 for processing information. In some embodiments, the processor 1304 may be a general purpose microprocessor.

The computer system 1300 also includes a main memory 1306, such as a random access memory (RAM) or other dynamic storage device, coupled to the bus 1302 for storing information and instructions to be executed by the processor 1304. The main memory 1306 may also be used for storing temporary variables or other intermediate information during execution of instructions to be executed by the processor 1304. Such instructions, when stored in non-transitory storage media accessible to the processor 1304, render the computer system 1300 into a special-purpose machine that is customized to perform the operations specified in the instructions. In various embodiments, instructions may include memory-storing instructions, which when executed by the one or more processors cause the computer system to carry out embodiments described herein.

The computer system 1300 further includes a read only memory (ROM) 1308 or other static storage device coupled to the bus 1302 for storing static information and instructions for the processor 1304. A storage device 1310, such as a magnetic disk or optical disk, is provided and coupled to the bus 1302 for storing information and instructions.

The computer system 1300 may be coupled via the bus 1302 to a display 1312, such as a computer monitor, for displaying information to a computer user. An input device 1314, including alphanumeric and other keys, is coupled to the bus 1302 for communicating information and command selections to the processor 1304. Another type of user input device is a cursor control 1316, such as a mouse, a trackball, or cursor direction keys for communicating direction information and command selections to the processor 1304 and for controlling cursor movement on the display 1312. This input device 1314 typically has two degrees of freedom in two axes, a first axis (e.g., x) and a second axis (e.g., y), that allows the input device 1314 to specify positions in a plane.

The computer system 1300 may implement the techniques described herein using customized hard-wired logic, one or more ASICs or FPGAs, firmware, and/or program logic, which, in combination with the computer system, causes or programs the computer system 1300 to be a special-purpose machine. According to one embodiment, the techniques herein are performed by the computer system 1300 in response to the processor 1304 executing one or more sequences of one or more instructions contained in the main memory 1306. Such instructions may be read into the main memory 1306 from another storage medium, such as the storage device 1310. Execution of the sequences of instructions contained in the main memory 1306 causes the processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 1310. Volatile media includes dynamic memory, such as the main memory

1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1302. Transmission media can also take the form of acoustic or light waves, such as those generated during radio wave and infrared data communications.

Various forms of media may be involved in carrying one or more sequences of one or more instructions to the processor 1304 for execution. For example, the instructions may initially be carried on a magnetic disk or solid-state drive of a remote computer. The remote computer can load the instructions into its dynamic memory and send the instructions over a network connection. A modem or network interface local to the computer system 1300 can receive the data. The bus 1302 carries the data to the main memory 1306, from which the processor 1304 retrieves and executes the instructions. The instructions received by the main memory 1306 may optionally be stored on the storage device 1310 either before or after execution by the processor 1304.

The computer system 1300 also includes a communication interface 1318 coupled to the bus 1302. The communication interface 1318 provides a two-way data communication coupling to a network link 1320 that is connected to a local network 1322. For example, the communication interface 1318 may be an integrated services digital network ("ISDN") card, cable modem, satellite modem, or a modem to provide a data communication connection to a corresponding type of telephone line. Wireless links may also be implemented. In any such implementation, the communication interface 1318 sends and receives electrical, electromagnetic, or optical signals that carry digital data streams representing various types of information.

The network link 1320 typically provides data communication through one or more networks to other data devices. For example, the network link 1320 may provide a connection through a local network 1322 to a host computer 1324 or to data equipment operated by an Internet Service Provider ("ISP") 1326. The ISP 1326 in turn provides data communication services through the world wide packet data communication network now commonly referred to as the "Internet" 1328. The local network 1322 and the Internet 1328 both use electrical, electromagnetic, or optical signals that carry digital data streams. The signals through the various networks and the signals on the network link 1320 and through the communication interface 1318, which carry the digital data to and from the computer system 1300, are example forms of transmission media.

The computer system 1300 can send messages and receive data, including program code, through the network (s), the network link 1320, and the communication interface 1318. In the Internet example, a server 1330 might transmit a requested code for an application program through the Internet 1328, the ISP 1326, the local network 1322, and the communication interface 1318. The received code may be executed by the processor 1304 as it is received, and/or stored in the storage device 1310, or other non-volatile storage for later execution.

Operations of processes described herein can be performed in any suitable order unless otherwise indicated herein or otherwise clearly contradicted by context. Processes described herein may be performed under the control of one or more computer systems (e.g., the computer system 1300) configured with executable instructions and may be implemented as code (e.g., executable instructions, one or more computer programs, or one or more applications) executing collectively on one or more processors, by hardware, or combinations thereof. The code may be stored on a machine-readable or computer-readable storage medium, for example, in the form of a computer program including a plurality of machine-readable code or instructions executable by one or more processors of a computer or machine to carry out embodiments described herein. The computer-readable storage medium may be non-transitory. The code may also be carried by any computer-readable carrier medium, such as a transient medium or signal, e.g., a signal transmitted over a communications network.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Some embodiments may be implemented as a system that includes one or more processors and logic encoded in one or more non-transitory computer-readable storage media for execution by the one or more processors. The logic when executed are operable to cause the one or more processors to perform embodiments described herein.

Some embodiments may be implemented as a system that includes one or more processors and a non-transitory storage medium storing processor-readable instructions. The processor-readable instructions when executed by the one or more processors of the system cause the system to carry out embodiments described herein.

Some embodiments may be implemented as a non-transitory computer-readable storage medium storing computer-readable code. The computer-readable code when executed by one or more processors of a computer cause the computer to carry out embodiments described herein.

Some embodiments may be implemented as a non-transitory computer-readable storage medium with program instructions stored thereon. The program instructions when executed by one or more processors are operable to cause the one or more processors to perform embodiments described herein.

Some embodiments may be implemented as a non-transitory computer-readable storage medium for use by or in connection with a instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments may be implemented as a non-transitory processor-readable storage medium including instructions executable by one or more digital processors. The instructions when executed by the one or more digital processors perform embodiments described herein.

Some embodiments may be implemented as a carrier medium carrying computer-readable code. When executed by one or more processors of a computer, the computer-readable code causes the computer to carry out embodiments described herein.

Some embodiments may be implemented as processor-implementable code provided on a computer-readable medium. The computer-readable medium may include a non-transient storage medium, such as solid-state memory, a magnetic disk, optical disk, etc., or a transient medium such as a signal transmitted over a computer network. The processor-implementable code when executed by one or more processors of a computer causes the computer to carry out embodiments described herein.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method for calibrating cameras in a live action scene, the method comprising:
   receiving images of the live action scene from a plurality of cameras;
   receiving reference point data generated from a performance capture system, wherein the performance capture system tracks a plurality of physical reference markers in the live action scene, wherein each physical reference marker is associated with a reference point, wherein the reference point data is based on at least three reference points, wherein the at least three reference points are positioned within the live action scene, wherein physical distances between each pair of reference points of the at least three reference points are predetermined, and wherein physical ratios between the physical distances are predetermined;
   computing a first image distance between a first pair of reference points of the at least three reference points in the images and a second image distance between a second pair of reference points of the at least three reference points in the images, wherein the first image distance corresponds to a first physical distance of the physical distances, wherein the second image distance corresponds to a second physical distance of the physical distances, and wherein the first image distance and the second image distance are associated with a first camera of the plurality of cameras; and
   determining a location and orientation of each camera based on the first image distance and the second image distance.

2. The method of claim 1, further comprising:
   computing an image ratio between the first image distance and the second image distance, wherein the image ratio differs from a corresponding physical ratio between the first physical distance and the second physical distance; and
   determining the location and orientation of at least the first camera based on a comparison between the image ratio and a corresponding physical ratio.

3. The method of claim 1, wherein the at least three reference points are attached to one or more moveable forms.

4. The method of claim 1, wherein distances between pairings of reference points of the at least three reference points are predetermined.

5. The method of claim 1, wherein the images are taken by the plurality of cameras within a predetermined time frame.

6. The method of claim 1, wherein the method further comprises:
   locating the at least three reference points in one or more images of the images; and
   computing distances between pair of reference points of the at least three reference points in the one or more images.

7. The method of claim 1, wherein the method further comprises triangulating each camera in the live action scene based on one or more image ratios of distances between pairs of reference points of the at least three reference points in one or more images.

8. A system for calibrating cameras in a live action scene, the system comprising:
   one or more processors; and
   logic encoded in one or more non-transitory computer-readable storage media for execution by the one or more processors and when executed operable to cause the one or more processors to perform operations comprising:
   receiving images of the live action scene from a plurality of cameras;
   receiving reference point data generated from a performance capture system, wherein the performance capture system tracks a plurality of physical reference markers in the live action scene, wherein each physical reference marker is associated with a reference point, wherein the reference point data is based on at least three reference points, wherein the at least three reference points are positioned within the live action scene, wherein physical distances between each pair of reference points of the at least three reference points are predetermined, and wherein physical ratios between the physical distances are predetermined;

computing a first image distance between a first pair of reference points of the at least three reference points in the images and a second image distance between a second pair of reference points of the at least three reference points in the images, wherein the first image distance corresponds to a first physical distance of the physical distances, wherein the second image distance corresponds to a second physical distance of the physical distances, and wherein the first image distance and the second image distance are associated with a first camera of the plurality of cameras; and determining a location and orientation of each camera based on the first image distance and the second image distance.

9. The system of claim 8, wherein locations of the at least three reference points in the live action scene are determinable.

10. The system of claim 8, wherein the at least three reference points are attached to one or more moveable forms.

11. The system of claim 8, wherein distances between pairings of reference points of the at least three reference points are predetermined.

12. The system of claim 8, wherein the images are taken by the plurality of cameras within a predetermined time frame.

13. The system of claim 8, wherein the logic when executed is further operable to cause the one or more processors to perform operations comprising:

locating the at least three reference points in one or more images of the images; and computing distances between pair of reference points of the at least three reference points in the one or more images.

14. The system of claim 8, wherein the logic when executed is further operable to cause the one or more processors to perform operations comprising triangulating each camera in the live action scene based on one or more image ratios of distances between pairs of reference points of the at least three reference points in one or more images.

15. A non-transitory computer-readable storage medium with program instructions stored thereon for calibrating cameras in a live action scene, the program instructions when executed by one or more processors are operable to cause the one or more processors to perform operations comprising:

receiving images of the live action scene from a plurality of cameras;

receiving reference point data generated from a performance capture system, wherein the performance capture system tracks a plurality of physical reference markers in the live action scene, wherein each physical reference marker is associated with a reference point, wherein the reference point data is based on at least three reference points, wherein the at least three reference points are positioned within the live action scene, wherein physical distances between each pair of reference points of the at least three reference points are predetermined, and wherein physical ratios between the physical distances are predetermined;

computing a first image distance between a first pair of reference points of the at least three reference points in the images and a second image distance between a second pair of reference points of the at least three reference points in the images, wherein the first image distance corresponds to a first physical distance of the physical distances, wherein the second image distance corresponds to a second physical distance of the physical distances, and wherein the first image distance and the second image distance are associated with a first camera of the plurality of cameras; and determining a location and orientation of each camera based on the first image distance and the second image distance.

16. The computer-readable storage medium of claim 15, wherein locations of the at least three reference points in the live action scene are determinable.

17. The computer-readable storage medium of claim 15, wherein the at least three reference points are attached to one or more moveable forms.

18. The computer-readable storage medium of claim 15, wherein distances between pairings of reference points of the at least three reference points are predetermined.

19. The computer-readable storage medium of claim 15, wherein the images are taken by the plurality of cameras within a predetermined time frame.

20. The computer-readable storage medium of claim 15, wherein the instructions when executed are further operable to cause the one or more processors to perform operations comprising:

locating the at least three reference points in one or more images of the images; and computing distances between pair of reference points of the at least three reference points in the one or more images.

* * * * *